Dec. 24, 1968 H. E. CABLE ET AL 3,417,979
WELDING OR CUTTING MACHINE WITH REMOVABLE TEMPLATE
Filed Aug. 10, 1965 2 Sheets-Sheet 1
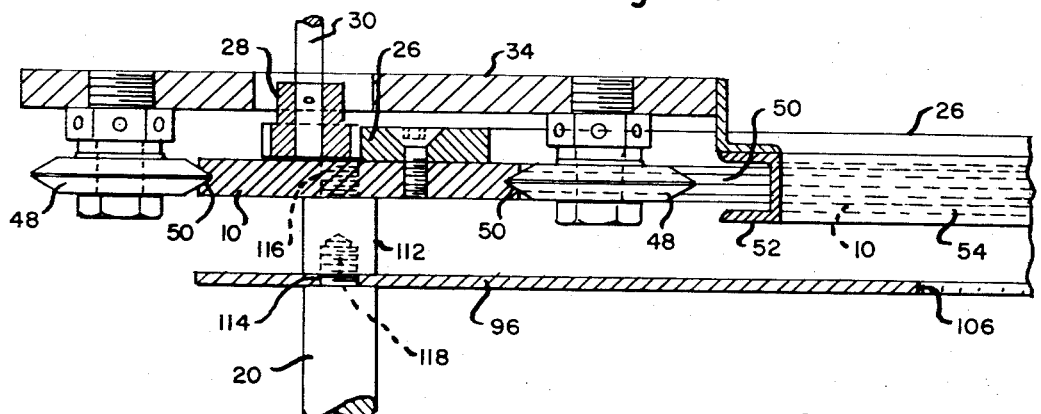
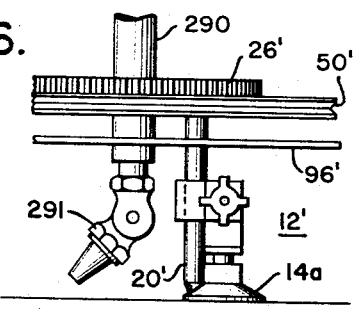
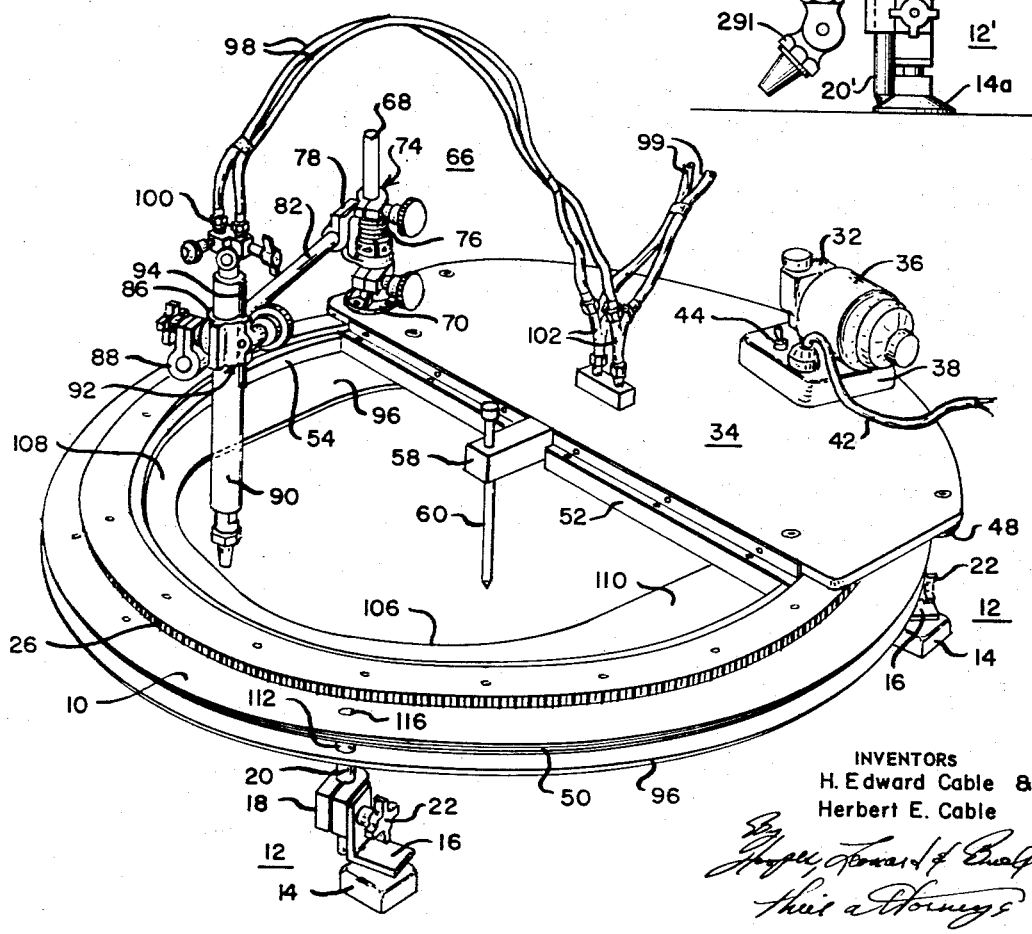
INVENTORS
H. Edward Cable &
Herbert E. Cable Dec. 24, 1968   H. E. CABLE ET AL   3,417,979
WELDING OR CUTTING MACHINE WITH REMOVABLE TEMPLATE
Filed Aug. 10, 1965   2 Sheets-Sheet 2
Fig. 2.
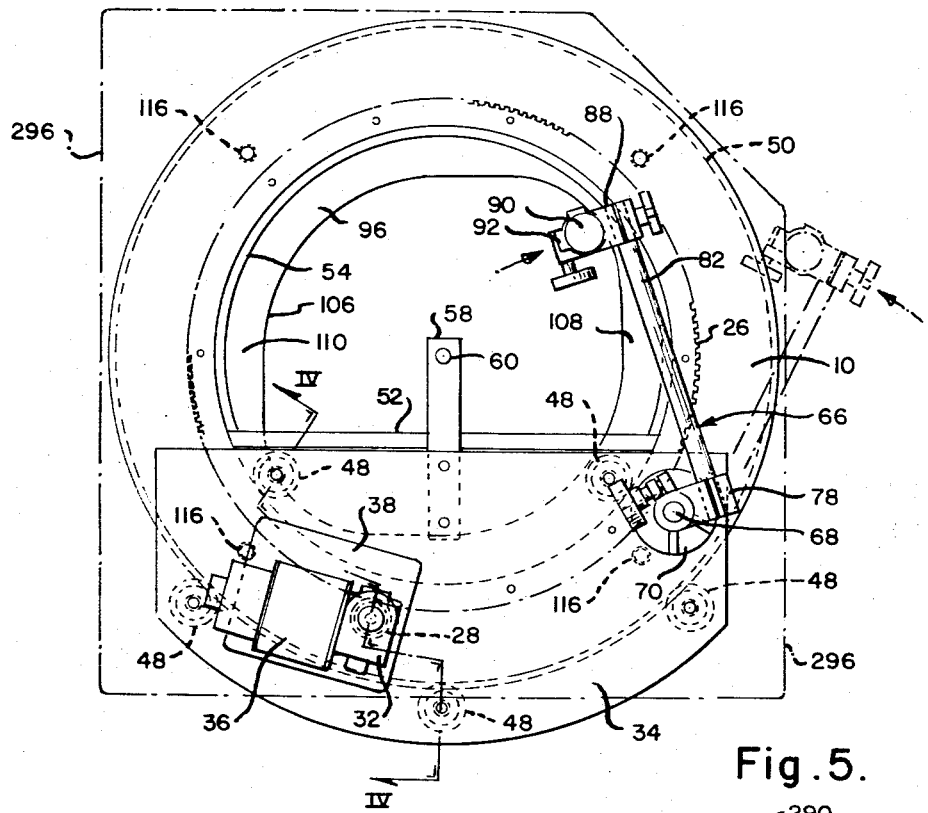
Fig. 3.
Fig. 5.
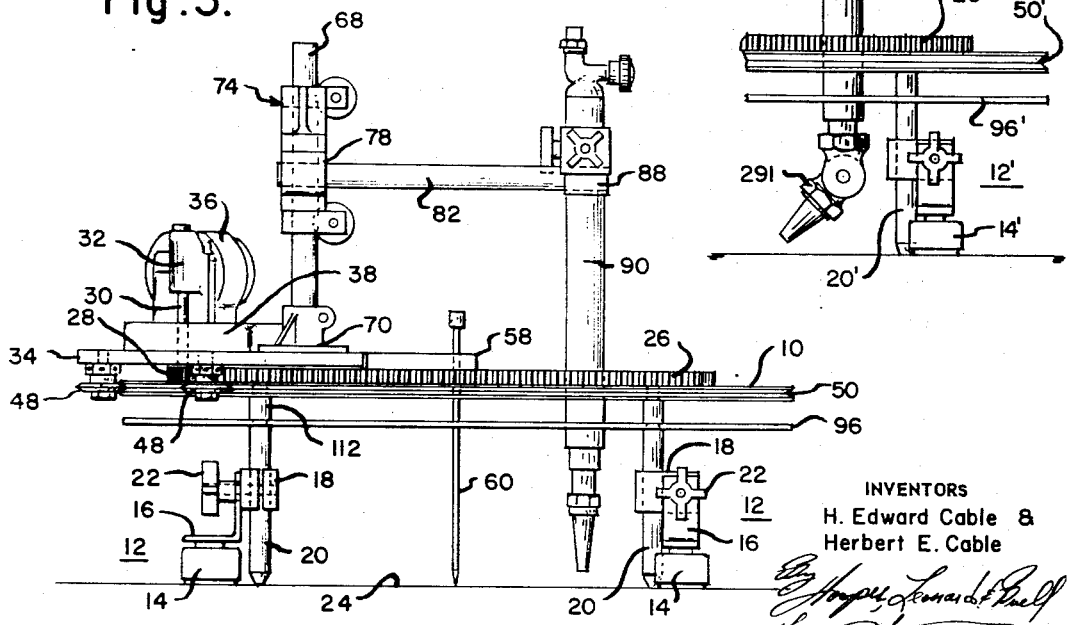
INVENTORS
H. Edward Cable &
Herbert E. Cable United States Patent Office 3,417,979
Patented Dec. 24, 1968

3,417,979
WELDING OR CUTTING MACHINE WITH
REMOVABLE TEMPLATE
Harold Edward Cable, Thornburg, and Herbert E. Cable,
Mount Lebanan Township, Allegheny County, Pa.,
assignors to Weld Tooling Corporation, Pittsburgh, Pa.,
a corporation of Pennsylvania
Filed Aug. 10, 1965, Ser. No. 478,587
12 Claims. (Cl. 266—23)

ABSTRACT OF THE DISCLOSURE

A machine for cutting, welding and the like provides in combination an annular support, a carriage rotatably mounted on the support, a drive means coupled to the carriage and support for rotating the two relative to one another, an adjustable tool support on the carriage, a tool guiding means on the annular support defining a path of tool travel and a biasing means acting on a tool in the tool support holding the tool against the guiding means.

---

The present invention relates to rotary cutting and welding machines, especially of the portable variety, and more particularly to a machine of the character described arranged for making non-circular cuts or welds.

There are a number of presently known and so-called circle cutting or welding machines of a rotary nature. Such machines take the form of a stationary platform or support about the center of which an adjustable arm or bracket bearing a cutting torch or welding head is rotated. The bracket can usually be adjusted to support the cutting torch at different radial distances from the center of the support. In operation, the torch or welding head is rotated about the support center until a circular hole or a weld is made in the sheet, plate, or other member in a fixed relation to which the support of the cutting machine is secured.

Although such machines are efficient for their intended purposes, only circular holes, cuts, or welds can be made reliably or repetitively thereby. In accordance with the present invention, guiding means are provided for use in conjunction with the aforementioned cutting and welding machines whereby such cutting and welding machines can be readily adapted to cut holes or make welds of non-circular contour and such contours can be readily and accurately repeated at the same or different locations. The cuts, holes, or welds, when using the means of the invention, can be elliptical, oval, or round, rectangular, square, or even non-geometrical or non-uniform in contour.

The guiding means of the invention can be detachably mounted on the cutting and welding machine so that the machine can be thus readily adapted for cutting or welding differing non-circular contours. Moreover, the machine can be adapted to cut a non-circular or non-uniform contour which is beveled either toward or away from the machine center. The invention is particularly useful in that the guiding means for the cutting torch or welding head thereof can be readily fabricated in the field as requirements for non-circular or non-uniform cuts or welds arise. The invention is especially adapted for a flame cutting or welding torch of the mechanized or motorized variety.

Throughout the remainder of this description, a cutting or welding machine arranged in accordance with the invention will be described with particular reference to the cutting operation although the machine is not so limited, as will be obvious to those skilled in the art.

The foregoing and other objects, features, and advantages of the invention together with constructional details thereof will be elaborated upon during the forthcoming description of exemplary embodiments of the invention, with the description being taken in conjunction with the accompanying drawings wherein:

FIGURE 1 is an isometric view of one form of hole burning or cutting machine arranged in accordance with the invention;

FIGURE 2 is a top plane view of the cutting machine shown in FIGURE 1;

FIGURE 3 is a elevational view of the cutting machine of the invention from the right of FIGURE 2;

FIGURE 4 is a sectional view of the cutting machine shown in the aforementioned figures on the line IV—IV of FIGURE 2;

FIGURE 5 is a segment of a vertical view of a cutter according to our invention showing a bevel cutting torch; and FIGURE 6 is a segment of support leg and vacuum member.

Referring now more particularly to FIGURES 1 to 4 of the drawings, the exemplary modification of the invention shown therein includes a generally circular or annular track or support 10, with the inner dimension of the annular track 10, being larger than the maximum dimension of the hole to be cut by the torch. The annular track 10 is supported upon a plurality of adjustable legs 12, whereby the annular track 10 can be mounted upon a plane or non-planar or irregular surface in which the hole is to be cut. In this example, four such legs 12 are utilized and are spaced symmetrically about the annular track 10. Each of the legs 12 are furnished with a swivel mounted magnetic foot 14, whereby the cutting machine can be mounted on a sloping or even a vertical surface, if fabricated from a magnetic material, such as an iron or steel bulkhead or the like. As viewed in FIGURES 1 and 3 of the drawings, a magnetic foot 14 is pivoted to the horizontally flanged portion of a mounting bracket 16 therefor, with the vertical flange of the bracket being pivoted to a clamp and hand screw arrangement denoted generally by reference character 18. The clamp arrangement 18 is slidably mounted for movement along the standard 20 of each leg 12 to a desired position where it is secured by actuating the hand screw 22. With the aforementioned pivoted connections of the magnetic foot 14 and its supporting bracket 16 the magnetic foot 14 can always lie flush upon the magnetic surface to which it is secured. Adjustment of the clamping arrangement 18, of course, allows considerable adjustment of the annular track 10 to accommodate any curvatures or lack of uniformity encountered in the surface 24 on which the cutting machine is mounted.

Supported on the annular track 10, concentrically thereof, is a circular rack or spur gear 26. The circular rack 26 is provided with suitably spaced gearing teeth about its outer periphery for engagement with a pinion 28 secured to the outlet shaft 30 of a speed reducing gearing train denoted generally by the reference character 32. The output shaft 30 extends through a suitable opening therefor in rotatable table or carriage 34 of the cutting machine, and the pinion 28 is secured to the output shaft at a position beneath the table 34 in meshing engagement with the circular rack 26.

Alternatively, a fixed roller chain or other uniformly linked chain and a sprocket or a cog and cog wheel system can be utilized respectively in place of the circular rack 26 and pinion 28.

The speed reducer 32 desirably is driven by a reversible, variable speed electric motor 36 permanently connected to the speed reducer 32 in a known manner and mounted therewith on mounting platform 38. The mounting platform 38 is internally wired (not shown) with electrical connections between the motor 36 and the input receptacle to which a plug and power cord 42 can be attached. A power switch 44 is also mounted upon the platform 38 and likewise internally wired.

The carriage 34 is mounted for rotation upon the annular track 10 by means of a plurality of wheels 48. As better shown in FIGURE 2, the wheels 48 are spaced symmetrically about the inner and outer periphery of the carriage 34 and are each provided with a peripherally projecting rib whereby the wheels 48 engage complementarily shaped grooves 50 formed in the peripheral edges of the annular track 10. Alternatively, each of the wheels 48 can be formed with a peripheral groove and the annular track 10 with opposed peripheral projections for cooperative insertion into the wheel grooves (not shown).

The inwardly extending portion of the rotatably mounted carriage 34 is provided with a channeled bracket 52, which in turn supports an arcuate channel member 54. The arcuate member 54 is slidably mounted upon the inner peripheral edge of the annular track 10, as better shown in FIGURE 1, and in one arrangement includes upper and lower outwardly extending flange portions which overlie respecively the adjacent upper and lower inward edge portions of the annular track 10 to provide a protective cover for the inside wheel groove. The circular channel member 54 can be fabricated from semi-circular components the ends of which can be sprung inwardly to snap the semi-circular components in the place about the inner periphery of the track member 10 to form a tongue-and-groove engagement, as it were. The ends can then be secured together respectively by welding or brazing or the like.

The track and circular rack 10, 26 can be mounted in any position including vertical and upside down positions, and the rotatable platform or carriage 34 will be rotatably secured to the annular track 10 by the tongue-and-groove engagement of the wheels 48 with the inner and outer peripheral edge of the annular track 10.

A projecting arm 58 extending over the center of rotation of the carriage 34 is secured thereto and carries a vertically extending (as viewed in the drawings) centering pin 60 extending through a vertical opening therefor in the projecting arm 58, where the pin is adjustably secured by means of a set screw or the like. The centering pin 60 aids in precisely locating the annular track 10 of the cutting machine with respect to the exact center of the non-circular opening to be cut by the machine. The lower end of the centering pin 60 is tapered to a point so that only the use of a center punch is needed to locate properly the annular track.

Mounted upon the rotatable carriage 34 is a torch or welding head support assembly denoted generally by reference character 66 and including an upright standard 68 the lower end of which is clamped in a mounting bracket 70 bolted to the rotatable carriage 34. A clamp assembly 74 is slidably and rotatably mounted on the standard 68. Rotation around the standard 68 is caused by the torsion spring 76 being tensioned to cause the arm 82 which is gripped in the clamp portion 78 to swing in the clock-wise direction as viewed in the drawings.

Adjacent the other end of the supporting arm 82, an adjustable cutting torch or welding head support bracket 86 is clamped at a given position along the supporting arm 82 by means of its screw clamp component 88. A cutting torch 90 can be adjustably raised or lowered in the support bracket 86 and relative to the clamp 88 and supporting arm 82 by means of a pinion and pinion hand wheel, denoted generally by reference character 92 and mounted on the torch bracket 86 for cooperation with a rack member 94 mounted vertically on the adjacent portion of the cutting torch 90.

With this arrangement, the torch support assembly 66 permits universal adjustment of the cutting torch 90, which can be raised or lowered relative to the workpiece or surface 24 to be cut by correspondingly adjusting the elevation of the clamp assembly 74 on standard 68, with vernier adjustments in elevation being accomplished by the rack and pinion 92, 94 of the torch support bracket 86. Radial or circumferential or horizontal movement of the torch 90 can be accomplished by adjustably moving the torch support bracket assembly 86 along the supporting arm 82. When required, a supporting arm 82 of different length can be replaced in the spring biased clamp 78 of the clamp assembly 74.

Thus, the cutting torch is biased outwardly by the support assembly 66 where it is retained during rotation of the carriage 34 against a guiding template 96 secured to the underside of the annular track 10 and described below in greater detail.

The necessary oxygen and acetylene, propane or other combustible gas are supplied to the torch 90 respectively through hoses 98 secured in a conventional manner through the usual mixing valve inlet 100 mounted on the upper end of the torch 90. The other ends of the hoses are secured respectively to a pair of Y shaped fittings 102 which are bolted to the top surface of the rotatable carriage 34. Similar hoses 99 can be coupled respectively so the inlets of the fittings 102 from suitable gas supplies.

In order to properly guide the cutting torch 90, suitable guiding means in the form of a detachable template 96 is secured to the annular track 10 and preferably to the underside thereof, as better shown in FIGURES 2 and 4 of the drawings. The template 96 thus can be more readily attached and detached from the annular track 10 to permit interchangeability of templates having differing sizes and shapes of non-circular or non-uniform openings therein. The template 96 is thus mounted in a secured stationary position with respect to the annular track 10 upon the surface or workpiece 24 to be cut, and as the rotatable carriage 34 revolves about the annular track 10 and the point of the centering pin 60, the lower barrel portion of the torch 90 rides against the inner periphery or non-circular contour 106 of the template 96. The biasing spring 76 of the clamp assembly 74 exerts sufficient force upon the movable portion 78 to urge the lower barrel portion of the cutting torch 90 lightly against the inner peripheral edge 106 of the template 96. The spring force therefor is adequate to ensure continuous contact between the torch 90 and the template without causing undue wear of the template or the torch barrel. Alternatively, suitable anti-friction means such as a cam wheel (not shown) can be slidably mounted upon the torch barrel, for vertical adjustment relative thereto, for engagement with the template inner periphery 106.

With reference now to FIGURE 4 of the drawings, an examplary arrangement for mounting the template 96 on the underside of the annular track 10 is illustrated therein. In this arrangement of the invention, the template 96 is furnished with an outside diameter corresponding to that of the annular track 10 and, for ease of handling and manufacture, may be fabricated from two semi-circular sections 108 and 110.

In this example of the invention, the template sections 108 and 110 are secured to the underside of the annular track 10 by a plurality of leg extensions 112, with four such extensions being employed in this arrangement of the invention and corresponding in number to the legs 12. Suitable openings 114 are similarly spaced in the template 96 and aligned with the leg extensions 112 when the latter are positioned for threading into similarly disposed tapped openings 116 in the annular track 10, as better shown in FIGURE 4 of the drawings. Upper threaded ends 118 of the leg standards 20 are insertable through the template openings 114 and threaded respectively into suitably tapped apertures formed respectively in the lower ends of the leg extensions 112.

It will be understood, of course, that the inner periphery 106 of the template 96 will be spaced outwardly of the adjacent edges of the opening to be cut by a distance equal to one-half the diameter of the torch barrel, where, as in this example, the cutting torch 90 is constructed symmetrically. When the torch 90 is provided with an offset tip to bevel the edges of the opening toward the centering pin 60, the spacing of the template inner periphery 106 will be correspondingly greater, and when the offset tip is disposed to bevel away from the centering pin 60, the aforesaid spacing will be correspondingly less.

As indicated previously, the cutting machine illustrated in the aforementioned drawings can also be employed for welding purposes and the like. In a case of arc welding, suitable wire feed means can be provided together with an appropriate weld head mounted in the torch support bracket 86. The position of the wire can be adjusted by any of the conventional means such as those depending upon voltage variation. Such means are well known and are not illustrated here.

In FIGURE 5 we have substituted a torch 290 for the torch of FIGURES 1–4. Torch 290 has an angularly adjustable tip 291 which permits cutting a substantially uniform bevel on the work. All other parts of this embodiment are identical with those of FIGURES 1–4 and are identified by like numbers primed. The device of our invention using an adjustable tip accomplishes uniform bevel cutting which was very difficult if not impossible with prior art machines.

In FIGURE 2 we have illustrated in chain line an outwardly extending template 296 which extends outwardly of the annular track 10. This template 296 may be substituted for template 96 for making cuts or welds larger than the track 10.

The work engaging means may be a vacuum member mounted on the support for substantially universal movement in substantially the same manner as the magnetic member and in substitution therefor as shown by the vacuum cups 14a of FIGURE 6.

In view of the foregoing, it will be apparent that novel and efficient forms of cutting and welding machinery have been disclosed herein. The descriptive and illustrative materials employed herein have been presented for purposes of exemplifying the invention and not in limitation thereof. Therefor, numerous embodiments of the invention will occur to those skilled in the art without departing from the spirit and scope of the invention. Furthermore, it is to be understood that certain features of the invention can be advantageously used without a corresponding use of other features thereof, and within the scope of the following claims.

We claim:

1. In a machine for cutting, welding, and the like, the combination comprising an annular support adapted to be supported by a workpiece, work engaging means on said support engaging the work to hold the support thereon, a carriage rotatably mounted on said support for rotation in a plane substantially parallel to the plane of the workpiece and the annular support, drive means coupled to said carriage and to said support for rotating said carriage about said support, an adjustable tool support assembly mounted on said carriage for rotation therewith, tool guiding means mounted on said annular support and defining a path of predetermined tool travel in a plane substantially parallel to the plane of the workpiece and the annular support, and means for biasing said tool against said guiding means when said tool is held by said support assembly during the rotation of said carriage.

2. In a machine for cutting, welding, and the like, the combination comprising an annular support adapted to be supported by a workpiece, work engaging means on said support engaging the work to hold the support thereon, a carriage rotatably mounted on said support for rotation in a plane substantially parallel to the plane of the workpiece and the annular support, drive means coupled to said carriage and to said support for rotating said carriage about said support, an adjustable tool support assembly mounted on said carriage for rotation therewith, guide means mounted on said support for said tool, said guide means including a template of generally annular configuration secured to said support and having an inner opening defining a path of predetermined tool travel in a plane substantially parallel to the plane of the workpiece and the annular support, and means for biasing said tool outwardly against the edges of said inner opening when said tool is held in said support assembly during rotation of said carriage.

3. In a machine for cutting, welding, and the like, the combination comprising an annular support adapted to be supported by a workpiece, work engaging means on said support engaging the work to hold the support thereon, a carriage rotatably mounted on said support for rotation in a plane substantially parallel to the plane of the workpiece and the annular support, drive means coupled to said carriage and to said support for rotating said carriage about said support, an adjustable tool support assembly mounted on said carriage for rotation therewith, guide means mounted on said support for said tool, said guide means including a template of generally annular configuration secured to said support having an outer peripheral edge portion defining a path of predetermined tool travel in a plane substantially parallel to the plane of the workpiece and the annular support, said edge portion extending outwardly of said annular support, means for biasing said tool inwardly against said template outer edge portion when said tool is held by said support assembly during rotation of said carriage.

4. In a machine for cutting, welding, and the like, the combination comprising an annular support adapted to be supported by a workpiece, work engaging means on said support engaging the work to hold the support thereon, a carriage rotatably mounted on said support, drive means coupled to said carriage and to said support for rotating said carriage about said support, an adjustable tool support assembly mounted on said carriage for rotation therewith, guide means mounted on said support for said tool, said guide means including a template of generally annular configuration secured to said support and having an inner opening defining a path of predetermined tool travel, means for biasing said tool outwardly against the edges of said inner opening when said tool is held in said support assembly during rotation of said carriage, and a centering pin secured to said carriage at the center of rotation thereof and extending through the opening of said template.

5. In a machine for cutting, welding, and the like, the combination comprising an annular support adapted to be supported by a workpiece, work engaging means on said support engaging the work to hold the support thereon, a carriage rotatably mounted on said support, drive means coupled to said carriage and to said support for rotating said carriage about said support, an adjustable tool support assembly mounted on said carriage for rotation therewith, guide means mounted on said support for said tool, said guide means including a template of generally annular configuration secured to said support having an outer peripheral edge portion defining a path of predetermined tool travel, said edge portion extending outwardly of said annular support, and means for biasing said tool inwardly against said template outer edge portion when said tool is held by said support assembly during rotation of said carriage, said template having a central opening therein disposed substantially concentrically of said annular support, said carriage having a centering pin disposed at the center of rotation thereof and extending through said central opening for engagement with a workpiece.

6. In a machine for cutting, welding, and the like, the combination comprising an annular support adapted to be supported by a workpiece, work engaging means on said support engaging the work to hold the support thereon, a carriage rotatably mounted on said support for rotation in a plane substantially parallel to the plane of the workpiece and the annular support, drive means coupled to said carriage and to said support for rotating said carriage about said support, an adjustable tool support assembly mounted on said carriage for rotation therewith, and tool guiding means mounted on said annular support and defining a path of predetermined tool travel in a plane substantially parallel to the plane of the workpiece and the annular support, said tool support assembly including a standard secured to said carriage and an arm and tool holding bracket hingedly secured to said standard in a position generally normal thereto, and biasing means coupled to said hinged securance for urging said arm and tool bracket in a direction such that said tool engages said guiding means when held by said tool bracket during rotation of said carriage 7. In a machine for cutting, welding, and the like, the combination comprising an annular support, a carriage rotatably mounted on said support, drive means coupled to said carriage and to said support for rotating said carriage about said support, an adjustable tool supporting assembly mounted on said carriage for rotation therewith, tool guiding means mounted on said support and defining a path of predetermined tool travel, and means for biasing said tool against said drive means when said tool is held by said supporting assembly during rotation of said carriage, said carriage being rotatably mounted upon said annular support by securance to a ring member slidably engaging the inner periphery of said annular support, tongue-and-groove means cooperatively formed on said ring member and said support to prevent lateral displacement of said ring member from the plane of said support, and by a plurality of wheels mounted adjacent the outer periphery of said carriage and engaging the outer periphery of said support, and complementary tongue-and-groove means cooperatively formed on said support outer periphery and said wheels to prevent lateral displacement of said wheels from the plane of said annular support.

8. In a machine for cutting, welding, and the like, the combination comprising an annular support adapted to be supported by a workpiece, work engaging means on said support adjustable to varying contours on the work engaging the work to hold the support thereon, a carriage rotatably mounted on said support for rotation in a plane substantially parallel to the plane of the workpiece and the annular support, drive means coupled to said carriage and to said support for rotating said carriage about said support, an adjustable tool support assembly mounted on said carriage for rotation therewith, tool guiding means mounted on said annular support and defining a path of predetermined tool travel in a plane substantially parallel to the plane of the workpiece and the annular support, and means for biasing said tool against said guiding means when said tool is held by said support assembly during the rotation of said carriage.

9. In a machine for cutting, welding, and the like, the combination comprising an annular support adapted to be supported by a workpiece, work engaging means on said support adjustable to varying contours on the work engaging the work to hold the support thereon, a carriage rotatably mounted on said support for rotation in a plane substantially parallel to the plane of the workpiece and the annular support, drive means coupled to said carriage and to said support for rotating said carriage about said support, an adjustable tool support assembly mounted on said carriage for rotation therewith, guide means mounted on said support for said tool, said guide means including a template of generally annular configuration secured to said support and having an inner opening defining a path of predetermined tool travel in a plane substantially parallel to the plane of the workpiece and the annular support, and means for biasing said tool outwardly against the edges of said inner opening when said tool is held in said support assembly during rotation of said carriage.

10. In a machine for cutting, welding, and the like, the combination comprising an annular support adapted to be supported by a workpiece, work engaging means on said support adjustable to varying contours on the work engaging the work to hold the support thereon, a carriage rotatably mounted on said support for rotation in a plane substantially parallel to the plane of the workpiece and the annular support, drive means coupled to said carriage and to said support for rotating said carriage about said support, an adjustable tool support assembly mounted on said carriage for rotation therewith, guide means mounted on said support for said tool, said guide means including a template of generally annular configuration secured to said support having an outer peripheral edge portion defining a path of predetermined tool travel in a plane substantially parallel to the plane of the workpiece and the annular support, said edge portion extending outwardly of said annular support, means for biasing said tool inwardly against said template outer edge portion when said tool is held by said support assembly during rotation of said carriage.

11. A machine for cutting, welding and the like as claimed in claim 8 wherein the work engaging means is a magnet pivotally mounted on said support for substantially universal movement.

12. A machine for cutting, welding and the like as claimed in claim 8 wherein the work engaging means is a vacuum member mounted on said support by substantially universal movement.

References Cited

UNITED STATES PATENTS

| | | |
|---|---|---|
| 2,408,517 | 10/1946 | Howard. |
| 2,985,963 | 5/1961 | Lee. |
| 1,396,993 | 11/1921 | Carter _____ 83—565 X |
| 2,116,680 | 5/1938 | Hawkes _____ 83—565 X |
| 2,499,938 | 3/1950 | Ward _____ 266—23 |
| 2,753,175 | 7/1956 | Greb et al. _____ 266—23 |
| 3,209,120 | 9/1965 | Glatthorn. |

J. SPENCER OVERHOLSER, *Primary Examiner.*

E. MAR, *Assistant Examiner.*

U.S. Cl. X.R.

33—27; 83—565

UNITED STATES PATENT OFFICE
CERTIFICATE OF CORRECTION

Patent No. 3,417,979                        December 24, 1968

Harold Edward Cable et al.

It is certified that error appears in the above identified patent and that said Letters Patent are hereby corrected as shown below:

Column 3, line 8, after "engage" insert -- opposed --; line 26, cancel "the", second occurrence. Column 4, line 22, "so" should read -- to --; line 49, "examplary" should read -- exemplary --.

Signed and sealed this 17th day of March 1970.

(SEAL)
Attest:

Edward M. Fletcher, Jr.                      WILLIAM E. SCHUYLER, JR.
Attesting Officer                              Commissioner of Patents